UNITED STATES PATENT OFFICE.

RUDOLPH BERENDES, OF ELBERFELD, GERMANY, ASSIGNOR TO SYNTHETIC PATENTS CO., INC., OF NEW YORK, N. Y., A CORPORATION OF NEW YORK.

BISMUTH SALT OF GALLOCARBOXYLIC ACID.

1,095,618.      Specification of Letters Patent.      Patented May 5, 1914.

No Drawing.      Application filed August 15, 1913. Serial No. 784,926.

*To all whom it may concern:*

Be it known that I, RUDOLPH BERENDES, doctor of philosophy, chemist, citizen of the German Empire, residing at Elberfeld, Germany, have invented new and useful Improvements in the Bismuth Salt of Gallocarboxylic Acid, of which the following is a specification.

My present invention concerns the production of the hitherto unknown and therapeutically valuable bismuth salt of gallocarboxylic acid (see *Ber.* 45, p. 1242) which can be obtained by converting the acid or its salts, etc., into its bismuth salt.

The new product has proved to be a valuable remedy as astringent and disinfecting agent. It is a light yellow powder insoluble in benzene, ether and alcohol, soluble in caustic alkalis. It contains about 60 per cent. of bismuth.

In order to illustrate the new process more fully the following examples are given, the parts being by weight:—

Example 1: 214 parts of anhydrous gallocarboxylic acid are dissolved in 1500 parts of methyl alcohol and the resulting solution is added to a solution of 966 parts of bismuth nitrate in 6000 parts of a 30 per cent. acetic acid. The precipitate is filtered off, washed until the wash-water is neutral and dried at a moderate temperature.

Example 2: 292 parts of the potassium salt of gallocarboxylic acid are dissolved in 4000 parts of warm water. Into the resulting solution wet hydroxid of bismuth obtained from 966 parts of nitrate of bismuth are stirred while acidulating the mixture. The yellow precipitate is filtered off, washed and dried.

Example 3: To a warm solution of 292 parts of anhydrous potassium salt of gallocarboxylic acid in 6000 parts of water, a solution of 966 parts of nitrate of bismuth in 6000 parts of a 30 per cent. acetic acid is added. The mixture thus obtained is neutralized and the salt is filtered off. It is a light yellow powder insoluble in benzene, ether and alcohol and soluble in caustic alkalis. It contains about 60 per cent. of bismuth.

I claim:—

The new product being chemically a bismuth salt of gallocarboxylic acid which is after being dried a light powder insoluble in ether, benzene and alcohol, soluble in caustic alkalis; being a valuable astringent and disinfecting agent; and containing about 60 per cent. of bismuth, substantially as described.

In testimony whereof I have hereunto set my hand in the presence of two subscribing witnesses.

RUDOLPH BERENDES. [L. S.]

Witnesses:
 HELEN NUFER,
 ALBERT NUFER.